US010777187B2

(12) United States Patent
Seki

(10) Patent No.: US 10,777,187 B2
(45) Date of Patent: Sep. 15, 2020

(54) SOUND COLLECTION APPARATUS, SOUND COLLECTION METHOD, SOUND COLLECTION PROGRAM, DICTATION METHOD, INFORMATION PROCESSING APPARATUS, AND RECORDING MEDIUM RECORDING INFORMATION PROCESSING PROGRAM

(71) Applicant: OLYMPUS CORPORATION, Hachioji-shi, Tokyo (JP)

(72) Inventor: Tsunehito Seki, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 269 days.

(21) Appl. No.: 15/969,004

(22) Filed: May 2, 2018

(65) Prior Publication Data

US 2018/0330716 A1 Nov. 15, 2018

(30) Foreign Application Priority Data

May 11, 2017 (JP) ................................. 2017-094467

(51) Int. Cl.
*G10L 15/07* (2013.01)
*G10L 15/22* (2006.01)
(Continued)

(52) U.S. Cl.
CPC ............ *G10L 15/07* (2013.01); *G10L 15/063* (2013.01); *G10L 15/22* (2013.01); *G10L 15/265* (2013.01);
(Continued)

(58) Field of Classification Search
CPC ........... G10L 15/063; G10L 2015/0635; G10L 2015/0638; G10L 15/065; G10L 15/07;
(Continued)

(56) References Cited

U.S. PATENT DOCUMENTS 6,064,959 A * 5/2000 Young ..................... G10L 15/22
704/251
8,515,752 B1 * 8/2013 Franz ...................... G10L 15/22
704/236
(Continued)

FOREIGN PATENT DOCUMENTS

JP 06-175686 A 6/1994
JP 2017-003608 A 1/2017

*Primary Examiner* — Eric Yen
(74) *Attorney, Agent, or Firm* — Volpe and Koenig, P.C.

(57) ABSTRACT

A sound collection apparatus includes: a sound collection unit including a microphone configured to collect sound; and a recording unit configured to record a personal dictionary used in voice recognition processing at dictation of voice collected by the sound collection unit. The sound collection apparatus further includes: a control unit configured to control provision of the personal dictionary to an information processing apparatus configured to execute dictation of voice collected by the sound collection unit; and a communication unit configured to transmit voice collected by the sound collection unit to the information processing apparatus and transmit, under control of the control unit, the personal dictionary to the information processing apparatus. This configuration achieves improved voice recognition performance even when a computer other than an exclusively used personal computer is used.

6 Claims, 9 Drawing Sheets

(51) Int. Cl.
*G10L 15/26* (2006.01)
*G10L 15/06* (2013.01)
*G10L 15/28* (2013.01)
*G10L 15/30* (2013.01)
*G10L 15/193* (2013.01)

(52) U.S. Cl.
CPC .............. *G10L 15/28* (2013.01); *G10L 15/30* (2013.01); *G10L 15/193* (2013.01); *G10L 2015/0635* (2013.01); *G10L 2015/0638* (2013.01)

(58) Field of Classification Search
CPC ....... G10L 15/26; G10L 15/265; G10L 15/28; G10L 15/285; G10L 15/30
See application file for complete search history.

(56) References Cited

U.S. PATENT DOCUMENTS

| | | | | |
|---|---|---|---|---|
| 8,775,175 | B1* | 7/2014 | Nagel | G10L 15/22 704/235 |
| 10,490,192 | B2* | 11/2019 | Ogawa | G10L 15/30 |
| 2002/0004736 | A1* | 1/2002 | Roundtree | G06Q 10/04 705/7.32 |
| 2002/0065652 | A1* | 5/2002 | Kushida | G10L 15/30 704/231 |
| 2003/0120493 | A1* | 6/2003 | Gupta | G10L 15/063 704/270.1 |
| 2005/0038644 | A1* | 2/2005 | Napper | G06K 9/00852 704/9 |
| 2005/0187766 | A1* | 8/2005 | Rennillo | G10L 15/26 704/235 |
| 2007/0005206 | A1* | 1/2007 | Zhang | G08G 1/09675 701/36 |
| 2008/0243834 | A1* | 10/2008 | Rieman | G06F 3/0237 |
| 2009/0125899 | A1* | 5/2009 | Unfried | G10L 15/28 717/168 |
| 2010/0151825 | A1* | 6/2010 | Millet Sancho | H04L 12/2816 455/411 |
| 2014/0088967 | A1* | 3/2014 | Kawamura | G10L 15/30 704/251 |
| 2015/0019221 | A1* | 1/2015 | Lee | G10L 15/08 704/246 |
| 2015/0187355 | A1* | 7/2015 | Parkinson | G06F 3/017 704/235 |
| 2015/0334346 | A1* | 11/2015 | Cheatham, III | H04N 7/147 348/14.05 |
| 2016/0379630 | A1* | 12/2016 | Assayag | G10L 15/22 704/235 |
| 2017/0053650 | A1* | 2/2017 | Ogawa | G10L 15/063 |
| 2017/0329573 | A1* | 11/2017 | Mixter | H04N 21/4147 |

\* cited by examiner

SOUND COLLECTION APPARATUS, SOUND COLLECTION METHOD, SOUND COLLECTION PROGRAM, DICTATION METHOD, INFORMATION PROCESSING APPARATUS, AND RECORDING MEDIUM RECORDING INFORMATION PROCESSING PROGRAM

CROSS REFERENCE TO RELATED APPLICATION

This application claims the benefit of Japanese Application No. 2017-094467 filed in Japan on May 11, 2017, the contents of which are incorporated herein by this reference.

BACKGROUND OF THE INVENTION

Field of the Invention

The present invention relates to a sound collection apparatus, a sound collection method, a sound collection program, a dictation method, an information processing apparatus, and a recording medium recording an information processing program, which are effective for dictation.

Description of Related Art

Recently, a dictation system configured to generate text through voice input has been used along with progress in voice recognition technologies. The dictation system receives inputting of text with voice, which has conventionally been performed by using a keyboard or the like.

The dictation system is used in various fields such as automation of dictation on a personal computer and inputting of mail sentences on a portable terminal. For example, in a medical field, the dictation system can be used to produce a medical record. Doctors need to have time periods necessary for use of various medical instruments and information terminals and contact with patients. The dictation system, which allows production of a medical record in a short time period, is extremely useful to doctors.

In voice recognition processing, input voice is acquired through a microphone, an acoustic feature value is extracted from the acquired input voice, and text is determined by referring to a language model established by a word dictionary based on a result of matching of the extracted feature value with an acoustic model.

The dictation system uses the acoustic model, the word dictionary, and the language model, which are prepared in the system in advance. However, when only a general-purpose language model and the like are used, recognition is performed at low accuracy in some cases, depending on a characteristic of speech by each user. Thus, in the dictation system, learning is performed for each user and a result of the learning is stored in a personal dictionary to minimize false recognition such as phoneme error, word error, and sentence error, thereby improving recognition accuracy at next voice recognition. Along with recent wide spread of personal computers, dictation has been performed by using a personal computer dedicated to a person (hereinafter referred to as an exclusively used PC) in some cases. In such a case, recognition performance can be improved by recording a personal dictionary on a built-in recording medium of the exclusively used PC.

Note that Japanese Patent Application Laid-Open Publication No. 2017-3608 discloses a technology which recognizes characteristics of speaking even when a speaker recognition function is turned off in a system configured to recognize a speaker and perform voice recognition.

SUMMARY OF THE INVENTION

A sound collection apparatus according to an aspect of the present invention includes: a sound collection unit including a microphone configured to collect sound; and a recording unit configured to record a personal dictionary used in voice recognition processing at dictation of voice collected by the sound collection unit.

A sound collection method according to another aspect of the present invention includes: a procedure of collecting sound by a sound collection unit including a microphone; a procedure of determining whether a personal dictionary used in voice recognition processing employed at dictation by an information processing apparatus configured to execute the dictation of voice collected by the sound collection unit is allowed to be provided to the information processing apparatus; and a communication procedure of transmitting voice collected by the sound collection unit to the information processing apparatus and transmitting the personal dictionary to the information processing apparatus based on a determination result whether or not the provision is allowed.

A sound collection program according to another aspect of the present invention is configured to cause a computer to execute: a procedure of collecting sound by a sound collection unit including a microphone; a procedure of determining whether a personal dictionary used in voice recognition processing employed at dictation by an information processing apparatus configured to execute the dictation of voice collected by the sound collection unit is allowed to be provided to the information processing apparatus; and a communication procedure of transmitting voice collected by the sound collection unit to the information processing apparatus and transmitting the personal dictionary to the information processing apparatus based on a determination result whether the provision is allowed or not.

A dictation method according to another aspect of the present invention includes: a procedure of receiving voice transmitted from a sound collection apparatus including a sound collection unit; a procedure of receiving, from the sound collection apparatus, a personal dictionary used in voice recognition processing employed at dictation of the voice; a procedure of generating a document through dictation processing on the received voice; and a procedure of transmitting, to the sound collection apparatus, update data of the personal dictionary updated as a result of learning processing on the generated document.

An information processing apparatus according to another aspect of the present invention includes: a communication unit configured to communicate with a sound collection apparatus including a microphone configured to collect sound; and a control unit configured to acquire, through the communication unit, a personal dictionary used in voice recognition processing employed at dictation to execute the dictation of voice collected by the sound collection apparatus.

A recording medium recording an information processing program according to another aspect of the present invention records the information processing program configured to cause a computer to execute: a procedure of communicating with a sound collection apparatus including a microphone configured to collect sound; and a control procedure of acquiring, through communication, a personal dictionary used in voice recognition processing employed at dictation to execute the dictation of voice collected by the sound collection apparatus.

The above and other objects, features and advantages of the invention will become more clearly understood from the following description referring to the accompanying drawings.

DETAILED DESCRIPTION OF PREFERRED EMBODIMENTS

Embodiments of the present invention will be described in detail below with reference to the accompanying drawings.

First Embodiment

Figure 1:
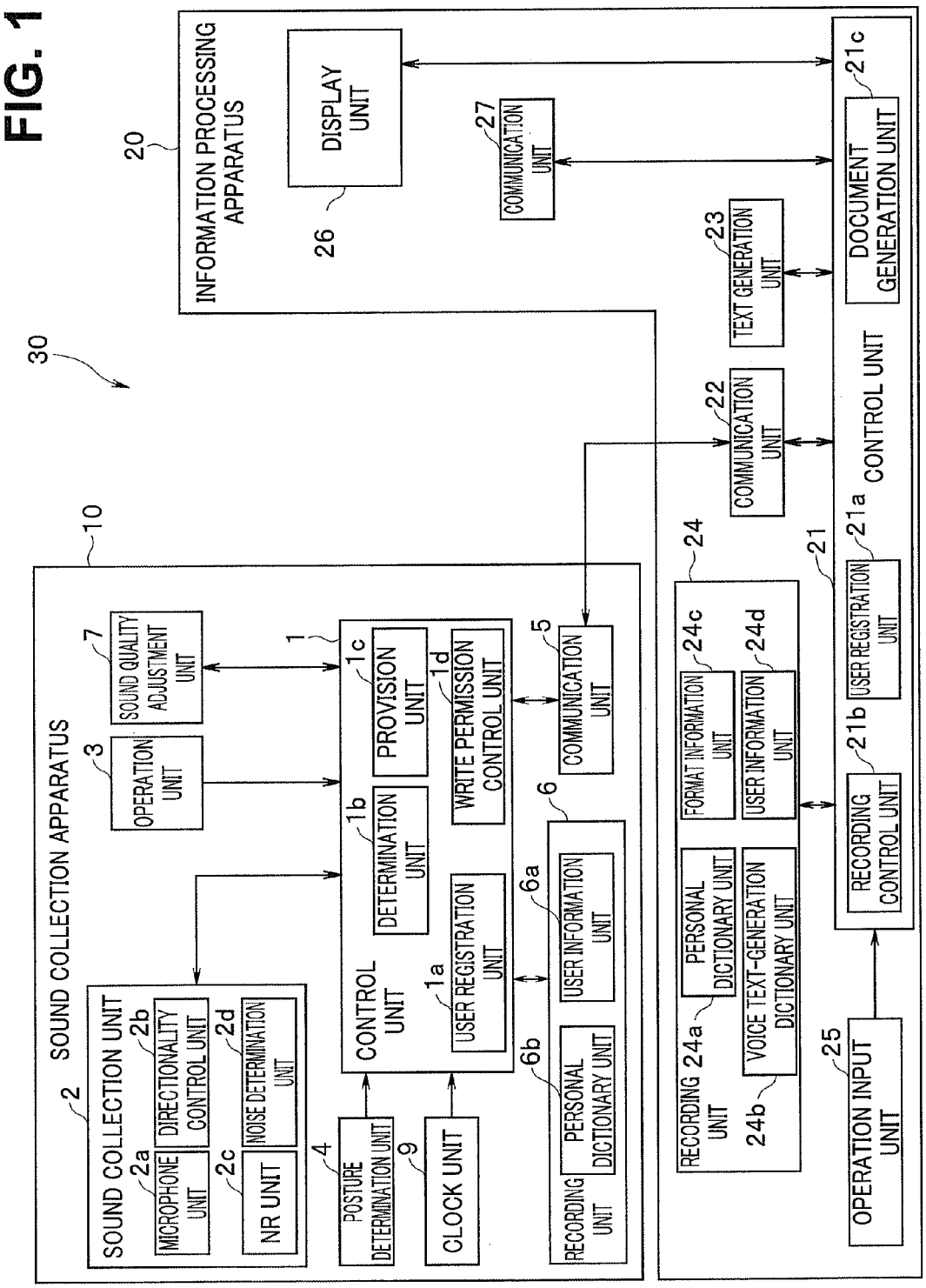
FIG. 1 is a block diagram illustrating a dictation system including a sound collection apparatus and an information processing apparatus according to a first embodiment of the present invention.

FIG. 1 is a block diagram illustrating a dictation system including a sound collection apparatus and an information processing apparatus according to a first embodiment of the present invention.

In the present embodiment, the sound collection apparatus may be, for example, a portable microphone apparatus, and the information processing apparatus may be, for example, a personal computer. The sound collection apparatus and the information processing apparatus can be each exclusively used by a user in some cases. In the following description, a sound collection apparatus exclusively used by a predetermined user is referred to as an exclusively used sound collection apparatus or an exclusively used microphone, and an information processing apparatus exclusively used by a predetermined user is referred to as an exclusively used information processing apparatus or an exclusively used PC (personal computer). At dictation, no problem occurs when an exclusively used PC can always be used. However, in some cases, dictation is performed by using a PC exclusively used by another person or a shared PC.

In the present embodiment, a personal dictionary that is personal information necessary for dictation can be registered to an exclusively used microphone apparatus. Accordingly, when a predetermined user having an exclusively used microphone apparatus dedicated to the user performs dictation by using a shared PC or a PC exclusively used by another person, dictation processing can be performed through highly accurate voice recognition processing as in a case in which dictation is performed by using a PC exclusively used by the user. In this case, the present embodiment can prevent various kinds of information from being read from a personal computer, which is an information processing apparatus, into a recording medium in a sound collection apparatus and from being taken out.

As illustrated in FIG. 1, a control unit 1 is provided in a sound collection apparatus 10. The control unit 1 includes a processor such as a CPU and may be configured to operate in accordance with a computer program stored in a memory (not illustrated) to control each component. The processor may be partially replaced with a hardware electronic circuit. The sound collection apparatus 10 includes a sound collection unit 2. The sound collection unit 2 includes a microphone unit 2a including a plurality of microphones.

Figure 2:
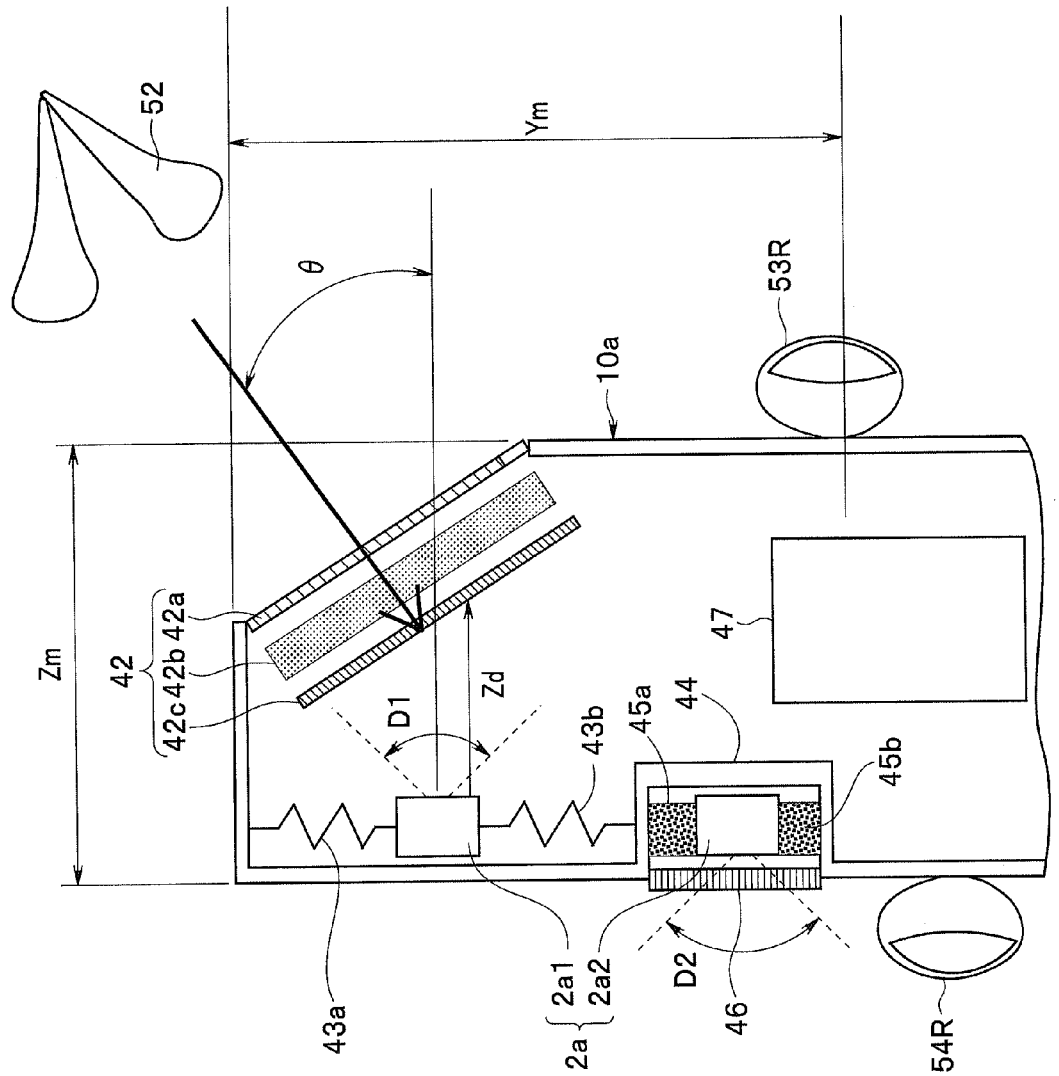
FIG. 2 is an explanatory diagram schematically illustrating a section of a housing 10a housing each component of a sound collection apparatus 10 illustrated in FIG. 1 when viewed from side.

FIG. 2 is an explanatory diagram schematically illustrating a section of a housing 10a housing each component of the sound collection apparatus 10 illustrated in FIG. 1 when viewed from side. FIG. 2 illustrates exemplary arrangement of internal components of the sound collection apparatus 10, in particular, exemplary arrangement of the microphone unit 2a including microphones 2a1 and 2a2. Note that FIG. 2 illustrates a state in which a user grasps front and back surfaces of the housing 10a with a thumb 53R and an index finger 54R of a right hand.

In the example illustrated in FIG. 2, the microphone unit 2a includes two microphones of the front microphone 2a1 and the back microphone 2a2. The microphone unit 2a collects surrounding sound, converts collected voice into a voice signal, and outputs the voice signal. A filter unit 42 is disposed at an upper end of the front surface side of the housing 10a and positioned obliquely relative to a longitudinal direction of the housing 10a. The filter unit 42 blocks an opening provided at the upper end of the front surface of the housing 10a. The filter unit 42 has a three-layer structure in which a relatively coarse mesh metal unit 42a, a nonwoven fabric 42b, and a relatively fine mesh metal unit 42c are provided in this order from the external side of the housing 10a to the internal side thereof. The filter unit 42 removes pop noise in voice emitted from a mouth 52.

The front microphone 2a1 is disposed at a position facing to the filter unit 42 on the back surface side inside the housing 10a. A housing part 44 in which the back microphone 2a2 is disposed is provided below the front microphone 2a1 on the back surface side inside the housing 10a. An elastic member 43b such as rubber is disposed between an upper surface of the housing part 44 and a bottom surface of the front microphone 2a1. An elastic member 43a such as rubber is disposed between an upper surface of the front microphone 2a1 and an upper surface of the housing 10a. The elastic members 43a and 43b allow the front microphone 2a1 to be held in the housing 10a and reduction of influence of vibration occurring to the housing 10a on the microphone 2a1. In particular, the elastic members 43a and 43b can reduce influence of vibration from the fingers 53R and 54R.

The housing part 44 is configured as a recess provided on the back surface of the housing 10a and blocked by a blockage member 46 provided with a large number of small holes. The back microphone 2a2 is disposed in the recess of the housing part 44. An elastic member 45a such as urethane is disposed between an upper surface of the microphone 2a2 and an upper surface of the recess. An elastic member 45b such as urethane is disposed between a bottom surface of the microphone 2a2 and a bottom surface of the recess. The elastic members 45a and 45b hold the microphone 2a2 in the recess.

A substrate 47 on which, for example, a component for each circuit of the sound collection apparatus 10 illustrated in FIG. 1 is mounted is disposed on a lower side inside the housing 10a.

The front microphone 2a1 has such a directional characteristic that sound can be collected in a sound collection range D1 illustrated with dashed lines in FIG. 2. The back microphone 2a2 has such a directional characteristic that sound can be collected in a sound collection range D2 illustrated with dashed lines in FIG. 2. In the present embodiment, an overall directional characteristic of the microphone unit 2a including the front microphone 2a1 and the back microphone 2a2 can be electrically controlled as described later.

Note that a thickness of the housing 10a is denoted by Zm, and a distance (microphone depth) between the front microphone 2a1 and the filter unit 42 in a horizontal direction is denoted by Zd. The thickness Zm is desirably as small as possible to reduce a thickness of the apparatus. The microphone depth Zd is set to be a distance sufficient to avoid generation of distortion in voice due to influence of airflow at sound collection. Since material of cushion members used as the elastic members 45a and 45b is different from material of cushion members used as the elastic members 43a and 43b, it is avoided for height Ym between the upper surface of the housing 10a and the bottom surface of the housing part 44 to become too high.

The sound collection unit 2 includes a directionality control unit 2b configured to control directionality of sound collection by the microphone unit 2a under control of the control unit 1. That is, the directionality control unit 2b can control a direction (hereinafter referred to as a beam direction) in which highest sensitivity is obtained at sound collection by the microphone unit 2a, and a range of the sound collection.

The sound collection unit 2 includes a noise reduction (NR) unit 2c. Upon reception of a voice signal from the directionality control unit 2b, the NR unit 2c removes a noise component from the signal and outputs a resulting signal. Unlike surrounding noise, voice has a sound pattern, a frequency characteristic of which largely changes in accordance with emotional expression of words and syllables and wording. However, noise has a largely changing sound magnitude (amplitude) rather than a difference in a frequency characteristic, and is clearly different from human voice, which has a slightly changing sound magnitude. Thus, the NR unit 2c may determine a noise frequency to be, for example, a specific frequency having a hardly changing frequency characteristic, and determine a voice component to be a component having a changing frequency characteristic. Accordingly, the NR unit 2c may remove the noise component from an inputted voice signal.

The sound collection unit 2 includes a noise determination unit 2d. The noise determination unit 2d determines environment noise in collected voice. For example, the noise determination unit 2d may determine the environment noise based on a synthesis signal of voice signals obtained by the microphones 2a1 and 2a2, or may determine the environment noise based on a voice signal obtained by either of the microphones 2a1 or 2a2, for example, the back microphone 2a2. For example, the noise determination unit 2d may calculate a mean square of a synthesis signal of voice signals obtained by the microphones 2a1 and 2a2 and may output the calculated value of the mean square as environment noise. Alternatively, for example, the noise determination unit 2d may calculate a mean square of a voice signal obtained by the back microphone 2a2 and may output the calculated value of the mean square as environment noise.

In this manner, the sound collection unit 2 performs directionality control on a voice signal of voice collected by the microphone unit 2a, and then removes noise from the voice signal and outputs the voice signal to the control unit 1. The sound collection unit 2 outputs, to the control unit 1, a result of the determination of environment noise by the noise determination unit 2d.

The sound collection apparatus 10 includes an operation unit 3. The operation unit 3 includes various keys and buttons and outputs, to the control unit 1, an operation signal based on a user operation. The control unit 1 receives an operation signal based on a user operation through the operation unit 3 and controls each component based on the operation signal. For example, a user can perform, through the operation unit 3, an operation to control the directional characteristic of the microphone unit 2a, and the control unit 1 can set, to the microphone unit 2a, a directional characteristic in accordance with the user operation.

The sound collection apparatus 10 also includes a posture determination unit 4. The posture determination unit 4 can be achieved by, for example, an acceleration sensor or a gyro sensor. The posture determination unit 4 determines a posture of the housing 10a of the sound collection apparatus 10, and outputs a result of the determination to the control unit 1. The sound collection apparatus 10 also includes a sound quality adjustment unit 7. The sound quality adjustment unit 7 can adjust, under control of the control unit 1, a frequency characteristic of voice collected by the sound collection unit 2. For example, the sound quality adjustment unit 7 may perform adjustment to correct a filter characteristic of the filter unit 42. The sound collection apparatus 10 also includes a clock unit 9. The clock unit 9 generates time information and outputs the time information to the control unit 1.

The sound collection apparatus 10 includes a communication unit 5. The communication unit 5 can perform, under control of the control unit 1, data transmission and reception with an external instrument in a wired or wireless manner. For example, the communication unit 5 is configured to be able to perform wireless LAN communication of Wifi or the like, or wireless communication of Bluetooth (registered trademark) or the like. The control unit 1 can transmit a voice signal acquired by the sound collection unit 2 to the external instrument through the communication unit 5.

The communication unit 5 can perform, for example, real-time communication (isochronous transfer) of voice or the like, which needs to be processed in real time, control communication of a command to control an instrument, and file transfer (bulk transfer) to communicate information stored in files. These communication processes may be performed in a temporally sequential manner or in a parallel manner. These communication manners can be selected in accordance with a communication scheme.

In the present embodiment, the sound collection apparatus 10 includes a recording unit 6. The recording unit 6 is achieved by a predetermined recording medium such as a semiconductor memory. Writing to and reading from the recording unit 6 are controlled by the control unit 1. The control unit 1 includes a user registration unit 1a. The user registration unit 1a can record, based on a user operation through the operation unit 3, information related to a user (user information) into a user information unit 6a of the recording unit 6. Note that hereinafter a user registered to the user information unit 6a is referred to as an exclusive user.

The recording unit 6 includes a personal dictionary unit 6b. The personal dictionary unit 6b records a personal dictionary of an exclusive user, which is used in dictation. The control unit 1 includes a provision unit 1c. When instructed to provide the personal dictionary of an exclusive user, which is read from the personal dictionary unit 6b, as the dictionary is needed for dictation upon start of dictation work, the provision unit 1c can transmit the personal dictionary to the information processing apparatus 20 through the communication unit 5 by communicating information with an information processing apparatus 20 to be described later. Note that the provision unit 1c may transmit a personal dictionary only to the information processing apparatus 20 exclusively used by a person other than a user registered to the user information unit 6a (exclusive user), or to the information processing apparatus 20 being shared. Alternatively, when the exclusive user of the sound collection apparatus 10 and the exclusive user of the information processing apparatus 20 are determined to be identical, the provision unit 1c may provide a personal dictionary to the control unit 1 of the sound collection apparatus 10 through a communication unit 22 irrespective of the instruction to provide a personal dictionary from the information processing apparatus 20.

As described above, the sound collection apparatus 10 includes the recording unit 6 to which a personal dictionary is registered and can transfer a personal dictionary to the information processing apparatus 20, thereby improving voice recognition performance when the user of the sound collection apparatus 10 (exclusive user) performs dictation using the information processing apparatus 20 exclusively used by another person or the information processing apparatus 20 being shared.

However, the sound collection apparatus 10, on which such a recording medium is mounted, is portable and can be used as a recording medium in which information held in a personal computer, which is the information processing apparatus 20. To prevent such information leak from a personal computer, the recording unit 6 in the present embodiment is set to be read-only.

In the present embodiment, the control unit 1 includes a write permission control unit 1d configured to control permission and restriction of writing to and reading from the recording unit 6. The write permission control unit 1d sets the recording unit 6 to a read-only state right after the sound collection apparatus 10 is turned on.

It is known that in dictation, the voice recognition performance can be improved through learning processing on a dictation result. That is, the voice recognition performance can be improved by updating a personal dictionary through learning, thereby achieving more accurate dictation.

In the present embodiment, to record such a learning result in the recording unit 6, the write permission control unit 1d can set the recording unit 6 to a write-permitted state under control of a determination unit 1b. The determination unit 1b determines a duration in which the recording unit 6 is set from a read-only state to the write-permitted state, and provides a result of the determination to the write permission control unit 1d. The write permission control unit 1d controls write and read setting of the recording unit 6 in accordance with the result of the determination by the determination unit 1b. For example, the determination unit 1b may set such a write-permitted duration that writing to the recording unit 6 is permitted only when update data of a personal dictionary, which is update information of a learning result, is inputted through the communication unit 5 from the information processing apparatus 20 exclusively used by a user registered to the user information unit 6a (exclusive user). Note that when update of the personal dictionary ends, the write permission control unit 1d sets back the recording unit 6 from the write-permitted state to the read-only state.

The information processing apparatus 20, which is achieved by a personal computer or the like, includes a control unit 21. The control unit 21 is achieved by a processor such as a CPU and may be configured to control each component by operating in accordance with a computer program stored in a memory (not illustrated). The processor may be partially replaced with a hardware electronic circuit.

The information processing apparatus 20 includes the communication unit 22. The communication unit 22 can perform, under control of the control unit 21, communication with the communication unit 5 of the sound collection apparatus 10 through a predetermined transmission path. The communication unit 22 can output, to the control unit 21, for example, a voice signal or a command transmitted from the sound collection apparatus 10.

That is, the communication unit 22 can perform, for example, real-time communication (isochronous transfer) of voice or the like, which needs to be processed in real time, control communication of a command to control an instrument, and file transfer (bulk transfer) to communicate information stored in files. These communication processes may be performed in a temporally sequential manner or in a parallel manner. These communication manners can be selected in accordance with a communication scheme.

The information processing apparatus 20 includes an operation input unit 25. The operation input unit 25 is achieved by a keyboard (not illustrated) or the like and outputs, to the control unit 21, an operation signal based on a user operation. The control unit 1 receives an operation signal based on a user operation through the operation input unit 25 and controls each component based on the operation signal.

The information processing apparatus 20 includes a recording unit 24. The recording unit 24 is achieved by a recording medium such as a hard disk or a semiconductor memory. A recording control unit 21b included in the control unit 21 controls recording and reproduction of information in the recording unit 24.

The control unit 21 includes a user registration unit 21a. The user registration unit 21a can record information related to a user (user information) in a user information unit 24d of the recording unit 24 based on a user operation through the operation input unit 25. Note that hereinafter a user registered to the user information unit 24d is referred to as an exclusive user. Note that the user information may be manually inputted, set by a system administrator, or acquired from a connected instrument.

The information processing apparatus 20 includes a text generation unit 23. The text generation unit 23 generates, under control of the control unit 21, text based on an inputted voice signal by well-known voice recognition processing. The recording unit 24 includes a voice text-generation dictionary unit 24b, which is used for the text generation. The text generation unit 23 calculates a feature value of a voice signal, performs matching calculation of the calculated feature value and an acoustic model, and generates text from information of human voice included in the voice signal by referring to voice text in the voice text-generation dictionary unit 24b.

The recording unit 24 includes a personal dictionary unit 24a. The personal dictionary unit 24a stores a personal dictionary of an exclusive user, which is used in voice recognition. The personal dictionary includes information corresponding to personal voice characteristics in voice recognition processing. The personal dictionary can be used to improve voice recognition accuracy for a person, the voice characteristics of which is registered to the personal dictionary. The text generation unit 23 improves voice recognition accuracy by referring to a personal dictionary recorded in the personal dictionary unit 24a at text generation.

In dictation processing on a voice signal received through the communication unit 22, the control unit 21 determines usage of a personal dictionary by referring to registered user information. For example, the control unit 21 compares user information through communication between the communication units 22 and 5 to determine whether user information of an exclusive user, which is registered to the user information unit 24d matches with user information of the exclusive user, which is registered to the sound collection apparatus 10. As a result of the user information comparison, when having determined that the exclusive user of the sound collection apparatus 10 is identical to the exclusive user of the information processing apparatus 20, the control unit 21 performs control to use a personal dictionary of a registered user recorded in the personal dictionary unit 24a in dictation. When having determined that the user (exclusive user) of the sound collection apparatus 10 is not identical to the exclusive user of the information processing apparatus 20, the control unit 21 instructs, through the communication unit 22 before start of dictation, the control unit 1 of the sound collection apparatus 10 to provide a personal dictionary.

The user information may be set by an administrator of the entire system or may be set by an exclusive user, an owner, or an administrator of the sound collection apparatus, or an owner or an administrator of the information processing apparatus. This selection may be made in accordance with a security level. The user information may be requested from one of instruments, transmitted by the other instrument, and acquired by the one instrument. That is, whether to provide a personal dictionary used in voice recognition processing may be determined based on a request from the user of the information processing apparatus that executes dictation, or may be precisely determined based on, for example, the user comparison.

When a personal dictionary is provided by the provision unit 1c of the sound collection apparatus 10, the recording control unit 21b of the control unit 21, for example, temporarily stores the personal dictionary in an available space of the personal dictionary unit 24a to use the personal dictionary in text generation.

The recording unit 24 records a format information unit 24c. The format information unit 24c records format information that describes a format used to generate a predetermined document from voice information generated in text. A document generation unit 21c of the control unit 21 refers to the format information in the format information unit 24c to generate a document from the voice information generated in text. The recording control unit 21b provides the generated document to the recording unit 24 and causes the recording unit 24 to record the document.

Figure 3:
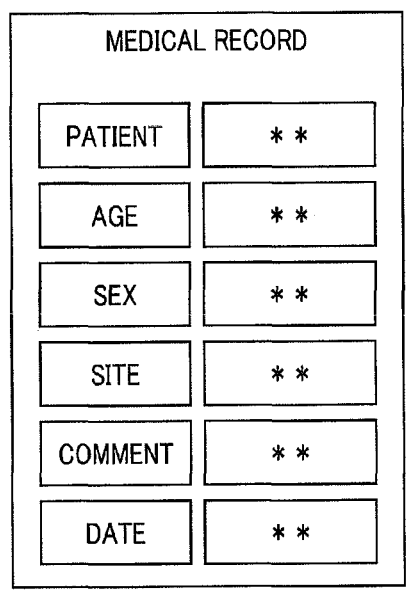
FIG. 3 is an explanatory diagram for description of an exemplary document generated by a document generation unit 21c.

FIG. 3 is an explanatory diagram for description of an exemplary document generated by the document generation unit 21c. In an example illustrated in FIG. 3, a medical record is generated as a document. The document generation unit 21c acquires a format of the medical record from the format information and generates a document of the medical record. The medical record illustrated in FIG. 3 includes items of "patient", "age", "sex", "site", "comment", and "date".

For example, a doctor speaks in an order of the items of the medical record illustrated in FIG. 3. In such a case, the text generation unit 23 sequentially generates text to be set to each item by generating text from voice spoken in the order of the items. The document generation unit 21c generates a medical record by disposing the sequentially acquired text in a column of each item.

The document generation unit 21c may determine content of information generated in text and dispose the information generated in text in each column in the medical record. For example, when a person name is generated in text, the document generation unit 21c may dispose the name generated in text in the column of "patient". For example, when voice spoken as "x years old" is generated in text, the document generation unit 21c may dispose the age generated in text in the column of "age". For example, the document generation unit 21c may determine an input operation to each item when a string generated in text matches with a string in the item. For example, text of voice that is inputted following sound of "patient" may be disposed in the column of "patient". In this manner, the medical record is automatically generated by the document generation unit 21c.

The information processing apparatus 20 includes a display unit 26. The display unit 26 can be achieved by, for example, a liquid crystal display (LCD) and can display, onto a display screen, an image supplied from the control unit 21. For example, the display unit 26 can perform, under control of the control unit 21, screen display for proceeding dictation processing such as display of various menu screens necessary for dictation work and display of dictation results.

The text generation unit 23 receives a learning operation by a user at text generation. The user can refer to a result of voice recognition that is generated in text, which is displayed on the display unit 26. When the voice recognition result has an error, the user can operate the operation input unit 25 to input text of correct voice as a voice recognition result. The text generation unit 23 executes, based on the input operation by the user, learning processing of correcting a personal dictionary that describes characteristics of personal voice. The recording control unit 21b updates, with a result of the learning processing, a personal dictionary in the personal dictionary unit 24a of the recording unit 24.

When having determined that the exclusive user of the sound collection apparatus 10 is identical to the exclusive user of the information processing apparatus 20, the control unit 21 issues, through the communication unit 22, a request to transfer a personal dictionary recorded in the personal dictionary unit 24a to the sound collection apparatus 10. In response to the transfer request from the information processing apparatus 20, the write permission control unit 1d sets the recording unit 6 of the sound collection apparatus 10, which is initially set to the read-only state as described above, to the write-permitted state. Accordingly, the control unit 21 transfers the personal dictionary in the personal dictionary unit 24a to the sound collection apparatus 10 through the communication units 22 and 5, and the control unit 1 writes the transferred personal dictionary to the personal dictionary unit 6b of the recording unit 6.

When having determined that the exclusive user of the sound collection apparatus 10 is not identical to the exclusive user of the information processing apparatus 20, the control unit 21 does not need to transfer a personal dictionary. However, writing of a personal dictionary is not limited to this configuration, but may be set by the administrator of the entire system, or restriction, permission, and other settings of the writing may be performed by the exclusive user, the owner, or the administrator of the sound collection apparatus, or the owner or the administrator of the information processing apparatus. This selection may be made in accordance with a security level requested by the system. The sound collection apparatus 10 may request to transfer the user information and the information processing apparatus 20 may receive and acquire the user information.

The information processing apparatus 20 also includes a communication unit 27. The communication unit 27 can communicate information with an external instrument through a predetermined transmission path. For example, the communication unit 27 is connectable with a computer on a cloud (not illustrated), and the control unit 21 can perform dictation processing by using the computer on the cloud.

Note that the user registration unit 1a of the sound collection apparatus 10 allows registration of an actual user. However, in the present embodiment, the actual user is assumed to be identical to the exclusive user of the sound collection apparatus 10, and description is omitted for a case in which the users are different from each other. Note that the exclusive user of the sound collection apparatus 10 may be a user for which a personal dictionary is recorded in the personal dictionary unit 6b, and the exclusive user of the information processing apparatus 20 may be a user for which a personal dictionary is recorded in the personal dictionary unit 24a. This configuration is also applicable to a case in which a plurality of exclusive users are registered to each dictionary.

Figure 4:
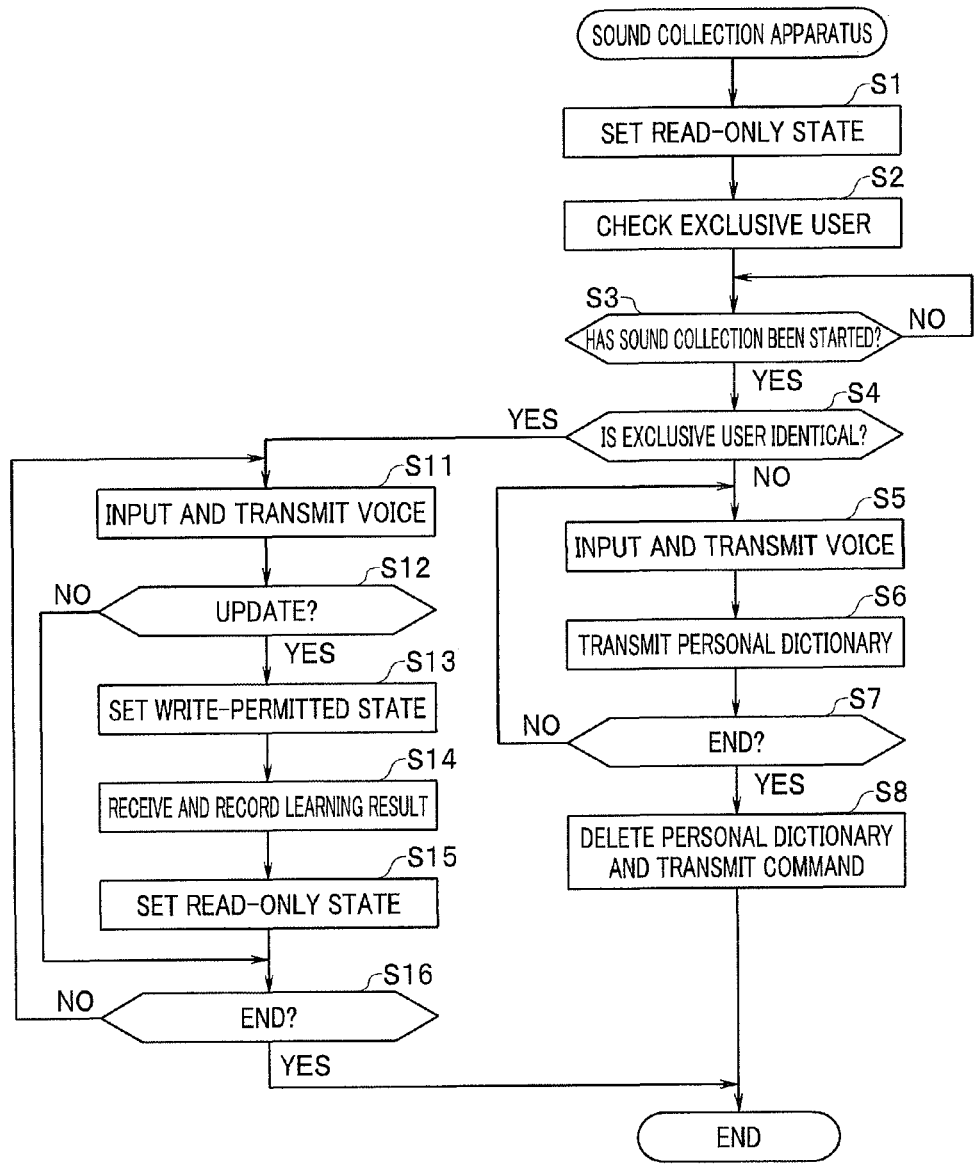
FIG. 4 is a flowchart for description of operation of the sound collection apparatus.
Figure 5:
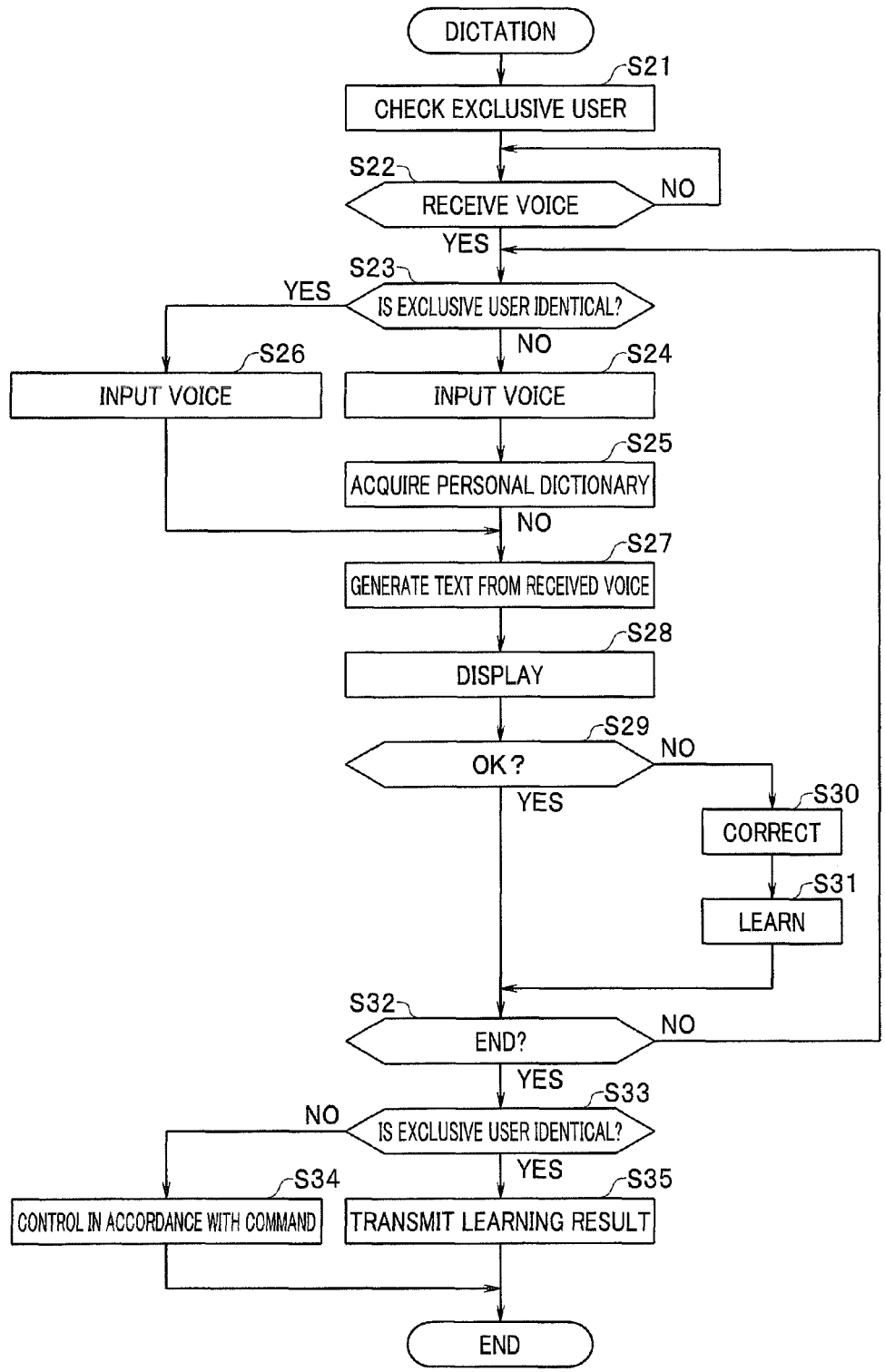
FIG. 5 is a flowchart for description of operation of an information processing apparatus 20.

The following describes operation of the embodiment thus configured with reference to FIGS. 4 and 5. FIG. 4 is a flowchart for description of operation of the sound collection apparatus, and FIG. 5 is a flowchart for description of operation of the information processing apparatus 20.

When the sound collection apparatus 10 is turned on, the write permission control unit 1d of the control unit 1 of the sound collection apparatus 10 sets the recording unit 6 to the read-only state at step S1 in FIG. 4, and then shifts to step S2. At sound collection and dictation, the control unit 1 of the sound collection apparatus 10 and the control unit 21 of the information processing apparatus 20 mutually check exclusive users at step S2 in FIG. 4 and step S21 in FIG. 5. That is, the control unit 1 reads user information from the user information unit 6a of the recording unit 6, and the control unit 21 reads user information from the user information unit 24d of the recording unit 24. Then, the control units 1 and 21 each perform mutual communication through the communication units 5 and 22 to check whether the exclusive user of the sound collection apparatus 10 and the exclusive user of the information processing apparatus 20 are identical to each other by comparing the user information of its own with the user information of the connected apparatus.

Subsequently, the control unit 1 waits for start of sound collection at step S3, and the control unit 21 waits for voice reception at step S22. Consider a case in which a user starts speaking for dictation. For example, as illustrated in FIG. 2, the user grasps the housing 10a with the fingers 53R and 54R of the right hand and speaks while the mouth 52 is positioned close to the microphone unit 2a. When sound collection is started at the sound collection apparatus 10, the control unit 1 shifts from step S3 to step S4 and determines whether the exclusive users are identical to each other.

(Exclusive Users not Identical)

Consider a case in which the exclusive user of the sound collection apparatus 10 and the exclusive user of the information processing apparatus 20 are not identical to each other. In such a case, the control unit 1 shifts to step S5 to perform voice input through speech by the user and transmit collected voice. That is, the control unit 1 controls the directionality control unit 2b to set directionality based on, for example, a user operation, and causes the microphone unit 2a to perform sound collection of speech. For example, the control unit 1 sets a predetermined beam direction with a narrow sound collection range and starts voice recording. For example, the beam direction may be a direction at an angle θ illustrated in FIG. 2.

The NR unit 2c performs noise cancellation processing on voice data obtained after the directionality control by the directionality control unit 2b, and outputs the voice data subjected to the noise cancellation to the control unit 1. The control unit 1 transmits, to the information processing apparatus 20 through the communication unit 5, the voice data from the sound collection unit 2 or voice data obtained by adjusting sound quality of the voice data at the sound quality adjustment unit 7.

Subsequently at step S6, the control unit 1 reads a personal dictionary in the personal dictionary unit 6b of the recording unit 6, and transmits the personal dictionary to the information processing apparatus 20 through the communication unit 5. At step S7, the control unit 1 determines whether sound collection processing for dictation has ended, and repeats steps S5 to S7 until the sound collection processing ends.

Having started the voice reception at step S22, the control unit 21 of the information processing apparatus 20 determines whether the exclusive users are identical to each other at step S23. When the exclusive users are not identical to each other, the control unit 21 receives a voice signal through the communication unit 22 at step S24. In addition, at step S25, the control unit 21 acquires a personal dictionary from the sound collection apparatus 10. The control unit 21 receives a personal dictionary provided by the provision unit 1c of the sound collection apparatus 10 through the communication unit 22, and the recording control unit 21b records the received personal dictionary in an available space of the personal dictionary unit 24a.

Next at step S27, the text generation unit 23 reads a voice text-generation dictionary from the voice text-generation dictionary unit 24b of the recording unit 24 and also reads the personal dictionary recorded in the personal dictionary unit 24a at step S25, and then performs text generation. The document generation unit 21c reads format information in the format information unit 24c of the recording unit 24, and generates a document based on voice generated in text. The text generation unit 23 provides the generated document to the display unit 26 and causes the display unit 26 to display the document (step S28).

The user determines whether dictation is correct by referring to the document displayed on the display unit 26 (step S29). When the dictation is correct, the processing shifts to step S32 and determines whether the dictation has ended. When the dictation processing has not ended, the control unit 21 returns the processing to step S23. When the dictation processing has ended, the control unit 21 proceeds to step S33. When error is found by the user at step S29, the text generation unit 23 corrects the generated text based on the finding. Note that the document generation unit 21c corrects the document based on a result of the correction by the text generation unit, and a result of this correction is displayed on the display unit 26. At step S31, the text generation unit 23 executes learning processing of updating a personal dictionary in the personal dictionary unit 6b based on the correction result.

When having determined that the dictation processing has ended at step S7, the control unit 1 of the sound collection apparatus 10 transmits a command to delete a personal dictionary at next step S8. The command is received by the control unit 21 of the information processing apparatus 20 through the communication units 5 and 22.

When having determined that the dictation processing has ended at step S32, the control unit 21 determines whether the exclusive users are identical to each other at next step S33. When the exclusive users are not identical to each other, the control unit 21 performs control in accordance with the command at step S34. That is, in this case, the recording control unit 21b of the control unit 21 deletes the personal dictionary recorded in the personal dictionary unit 24a at step S25.

In this manner, when the exclusive users are not identical to each other, the sound collection apparatus 10 transfers the personal dictionary recorded in the recording unit 6 to an information processing apparatus exclusively used by another person or a shared information processing apparatus so that the personal dictionary is used in dictation processing. Accordingly, even when an information processing apparatus other than an exclusively used PC is used, the exclusive user of the sound collection apparatus 10, which is an exclusively used microphone apparatus, can perform dictation with the voice recognition performance equivalent to the voice recognition performance when an exclusively used PC is used.

(Exclusive Users Identical)

Next, consider a case in which the exclusive user of the sound collection apparatus 10 and the exclusive user of the information processing apparatus 20 are identical to each other. In this case, the control unit 1 shifts from step S4 to step S11 to perform voice input through speech by the user and transmit collected voice, and then determines whether processing of updating a personal dictionary is generated at step S12. Note that the voice inputting and transmission processing at step S11 is the same as the processing at step S5. Since the exclusive users are identical to each other in this case, it is expected that information identical to the personal dictionary recorded in the recording unit 6 of the sound collection apparatus 10 is recorded in the recording unit 24 of the information processing apparatus 20, and thus processing of providing a personal dictionary is omitted.

When it is determined that the exclusive users are identical to each other at step S23, the control unit 21 of the information processing apparatus 20 receives a voice signal through the communication unit 22 at step S26. Note that the processing at step S26 is the same as the processing at step S24. Subsequently, the information processing apparatus 20 performs text generation, document generation, and learning processing at steps S27 to S32.

When having determined that the dictation processing has ended at step S32, the control unit 21 determines whether the exclusive users are identical to each other at next step S33. Since the exclusive users are identical to each other in this case, the control unit 21 issues a request to update a learning result and transmits the learning result at step S35, and then ends the processing. For example, the control unit 21 may directly read a personal dictionary recorded in the personal dictionary unit 24a and transmit the personal dictionary through the communication unit 22, or may transmit only differential data corresponding to change in the personal dictionary through the communication unit 22.

Having determined whether the request to update the learning result is issued at step S12, the determination unit 1b of the sound collection apparatus 10 instructs, upon reception of the update request, the write permission control unit 1d to set the recording unit 6 to the write-permitted state while the learning result is updated. The write permission control unit 1d sets the recording unit 6 to the write-permitted state at step S13. The control unit 1 receives the updated data of the learning result transmitted from the information processing apparatus 20 and updates the personal dictionary unit 6b with the updated data (step S14). Note that when having determined that no update request is issued at step S12, the determination unit 1b proceeds to step S16.

When the update of the personal dictionary unit 6b has ended, the write permission control unit 1d sets the recording unit 6 to the read-only state again (step S15). Next at step S16, the control unit 1 determines whether an operation to end sound collection processing for dictation is performed. When no end operation is performed, the control unit 1 returns the processing to step S11. When the end operation is performed, the control unit 1 ends the processing.

In this manner, when the exclusive users are identical to each other, the sound collection apparatus 10 updates the personal dictionary unit 6b with the learning result from the information processing apparatus 20. Accordingly, even when an information processing apparatus other than an exclusively used PC is used at subsequent dictation, dictation can be performed with the voice recognition performance equivalent to the voice recognition performance when an exclusively used PC is used. In addition, the control unit 1 sets the recording unit 6 to the write-permitted state only in a duration when the learning result is updated, and sets the recording unit 6 to the read-only state in other duration. Accordingly, information can be prevented from leaking from the information processing apparatus 20 through the sound collection apparatus 10.

In the present embodiment as described above, the recording unit configured to register a personal dictionary necessary for dictation is provided to transfer the personal dictionary to the information processing apparatus as necessary. Thus, dictation processing can be performed through highly accurate voice recognition processing when dictation is performed by using a personal computer exclusively used by another person or a shared personal computer. In this case, various kinds of information can be prevented from being read from the personal computer, which is the information processing apparatus, into a memory in the sound collection apparatus and from being taken out.

That is, an information processing apparatus is provided that includes a communication unit configured to communicate with a microphone, and a control unit configured to acquire, through the communication unit, a personal dictionary used in voice recognition processing to execute dictation of voice collected by a sound collection unit. This configuration allows accurate voice recognition processing to be executed when a user having an exclusively used microphone apparatus uses any PCs.

Second Embodiment

Figure 6:
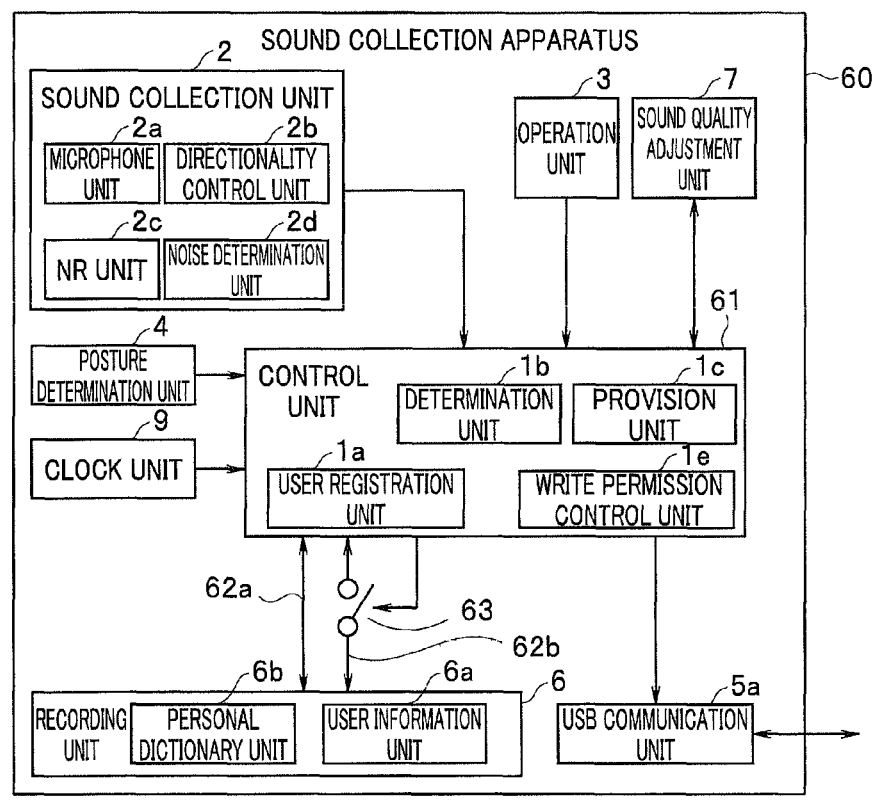
FIG. 6 is a block diagram illustrating a sound collection apparatus according to a second embodiment of the present invention.

FIG. 6 is a block diagram illustrating a sound collection apparatus according to a second embodiment of the present invention. In FIG. 6, any component identical to a component illustrated in FIG. 1 is denoted by an identical reference sign, and description of the component will be omitted. The present embodiment describes an example in which an USB communication unit 5a that is a USB standard controller is employed as the communication unit 5 illustrated in FIG. 1. The USB communication unit 5a is connected with the communication unit 22 of the information processing apparatus 20 illustrated in FIG. 1 through a USB cable (not illustrated).

Note that when USB connection is established, the communication unit 22 of the information processing apparatus 20 operates as a USB master (USB host) under control of the control unit 21. When connected with the communication unit 22 through the USB cable, the USB communication unit 5a of a sound collection apparatus 60 functions as a USB slave.

A control unit 61 according to the present embodiment is different from the control unit 1 illustrated in FIG. 1 in that a write permission control unit 1e compatible with USB connection is provided in place of the write permission control unit 1d. The control unit 61 and the recording unit 6 are connected with each other through signal lines 62a and 62b so that the write permission control unit 1e can control the recording unit 6 by transmitting various kinds of commands through the signal line 62a. The control unit 61 can read data recorded in the recording unit 6 through the signal line 62b.

In the present embodiment, too, after the sound collection apparatus 60 is turned on, the determination unit 1b and the write permission control unit 1e set the recording unit 6 to the read-only state, and set the recording unit 6 to the write-permitted state only in a duration when the personal dictionary unit 6b is updated with a learning result from the information processing apparatus 20.

However, when USB connection is established between the USB communication unit 5a and the communication unit 22, the control unit 21 of the information processing apparatus 20 mounts the recording unit 6 of the sound collection apparatus 60 by a function of an OS. After this mount processing, it is possible to access a file recorded in the recording unit 6 of the sound collection apparatus 60 through the OS operating on the control unit 21 or an application program operating on the OS. Note that since the recording unit 6 is set to the read-only state, writing to the recording unit 6 cannot be performed by the information processing apparatus 20.

While the recording unit 6 is mounted through the USB connection, the control unit 61 of the sound collection apparatus 60 cannot uniquely perform writing to, reading from, or control of the recording unit 6, and the recording unit 6 is set to be a USB connection mode in which operation of the recording unit 6 is controlled by the control unit 21 of the information processing apparatus 20. Thus, while the recording unit 6 is mounted, for example, only reading and transferring of transfer data from the recording unit 6 are performed in accordance with reading control by the control unit 21.

In the present embodiment, a switch 63 is provided in the sound collection apparatus 60 to allow the sound collection apparatus 60 to cancel (unmount) mounting of the recording unit 6. The switch 63 is turned on and off under control of the write permission control unit 1e. When the switch 63 is turned off, the signal line 62b is cut off so that the control unit 21 of the information processing apparatus 20 cannot access the recording unit 6 through the control unit 1.

When a duration when a personal dictionary is updated with a learning result is specified by the determination unit 1b, the write permission control unit 1e turns off the switch 63 to cut off access from the control unit 21 of the information processing apparatus 20 to the recording unit 6. Accordingly, mounting of the recording unit 6 is canceled. After mounting of the recording unit 6 is canceled, the write permission control unit 1e sets the recording unit 6 to the write-permitted state, and then turns on the switch 63 to mount the recording unit and enable update of the personal dictionary. When the update of the personal dictionary ends, the write permission control unit 1e turns off the switch 63 to cancel mounting of the recording unit 6 and sets the recording unit 6 to the read-only state again, and then turns on the switch 63 to mount the recording unit 6.

Thus, in the present embodiment, the recording unit 6 cannot be directly set to the write-permitted state through a user operation on the information processing apparatus 20. In addition, connection between the USB communication unit 5a and the communication unit 22 through the USB cable does not need to be cut to unmount the recording unit 6 so that the recording unit 6 switches to the write-permitted state. The unmount processing and the mount processing are automatically performed when a duration for updating a personal dictionary is determined by the determination unit 1b. Accordingly, it is difficult for a user to determine a duration when writing to the recording unit 6 is permitted, thereby preventing information leak through the recording unit 6.

Figure 7:
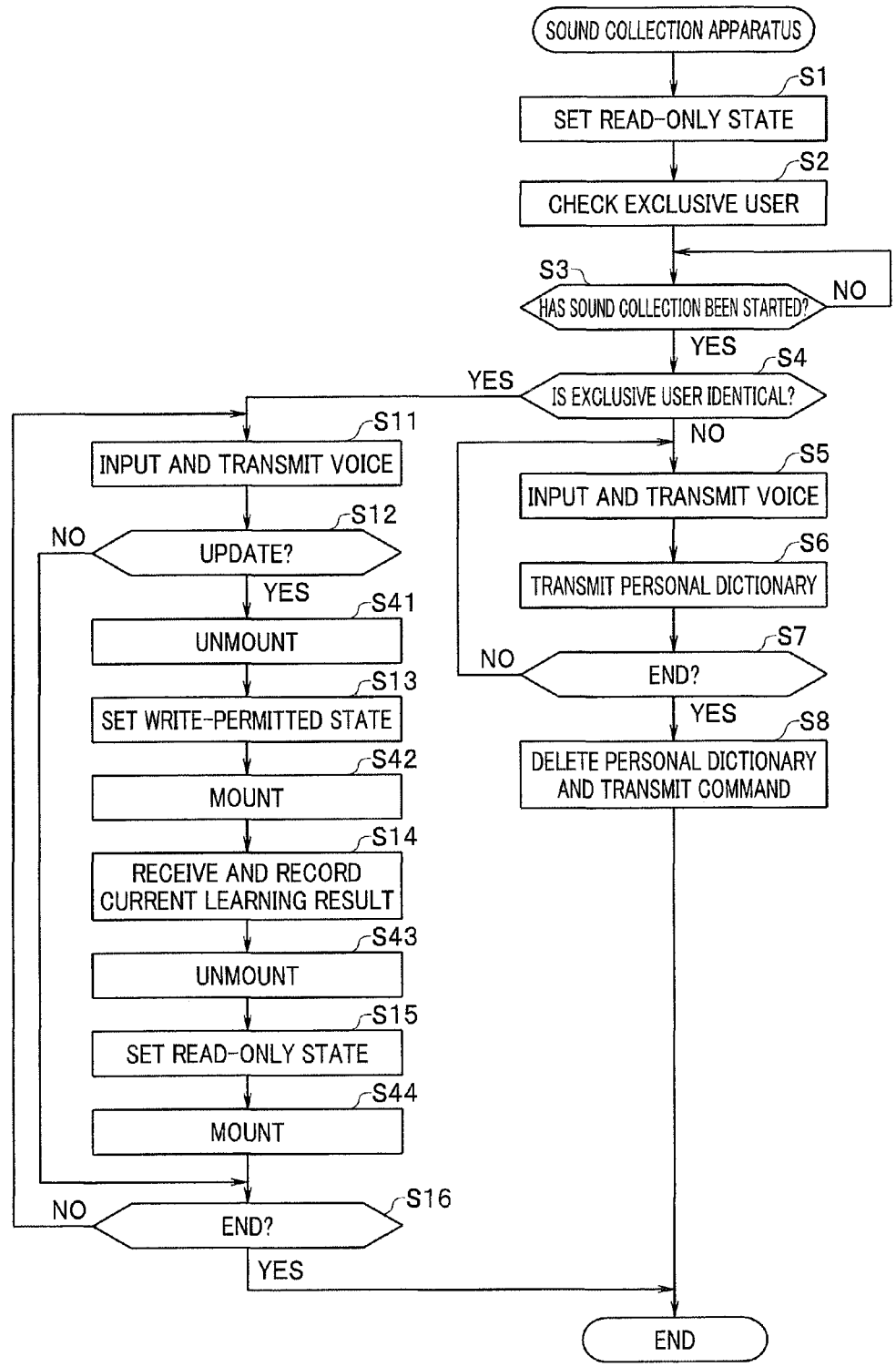
FIG. 7 is a flowchart for description of operation of the sound collection apparatus in the second embodiment.

The following describes operation of the embodiment thus configured with reference to a flowchart illustrated in FIG. 7. FIG. 7 is a flowchart for description of operation of the sound collection apparatus. In FIG. 7, any procedure identical to a procedure in FIG. 4 is denoted by an identical reference sign, and description of the procedure will be omitted.

The present embodiment is different from the first embodiment in that, as illustrated in FIG. 7, processing at steps S41 to S44 is added to the flow illustrated in FIG. 4. Operation the same as the operation in the first embodiment is performed when the exclusive users are not identical to each other. When the exclusive users are identical to each other, update of a learning result is performed, and thus the unmount and mount processing is performed to switch the recording unit 6 between the read-only state and the write-permitted state.

That is, when a request to update the personal dictionary unit 6b based on a learning result is issued at step S12, the write permission control unit 1e proceeds to step S41 and turns off the switch 63 to execute the unmount processing of the recording unit 6. After the recording unit 6 is unmounted, the write permission control unit 1e sets the recording unit 6 to the write-permitted state (step S13), and subsequently turns on the switch 63 to mount the recording unit 6 again (step S42). Accordingly, the control unit 21 of the information processing apparatus 20 can access the recording unit 6 and update the personal dictionary unit 6b by providing update data of a personal dictionary to the recording unit 6 based on the learning result through the communication unit 22, the USB communication unit 5a, and the control unit 61 (step S14).

When the update of the personal dictionary ends, the write permission control unit 1e turns off the switch 63 to execute the unmount processing of the recording unit 6 at step S43 so that the recording unit 6 is set to the read-only state again. After the recording unit 6 is unmounted, the write permission control unit 1e sets the recording unit 6 to the read-only state (step S15), and subsequently turns on the switch 63 to mount the recording unit 6 again (step S44). Accordingly, the control unit 21 of the information processing apparatus 20 can access the recording unit 6 in the read-only state.

Note that since the connection through the USB cable does not need to be cut when such an update processing is performed, the sound collection apparatus 60 can continuously perform sound collection and voice signal transmission processing.

Other effects are the same as an effect of the first embodiment.

In the present embodiment as described above, when the recording unit of the sound collection apparatus operates as a slave of the information processing apparatus, the unmount and mount processing of the recording unit is performed at writing of update data of a personal dictionary based on a learning result, thereby enabling the recording unit to be switched between the read-only state and the write-permitted state. Accordingly, effects the same as an effect of the first embodiment can be obtained in the present embodiment. Since setting of the recording unit can be changed without cutting the connection through the USB cable, sound collection and voice signal transmission functions can be continuously provided. In addition, since a user cannot determine a write-permitted duration, information leak is likely to be prevented.

Note that, in the present embodiment, the unmount processing is performed by cutting off, through the switch 63, access from the control unit 21 to the recording unit 6, but the unmount processing may be performed by temporarily cutting off USB communication at the control unit 1.

(Modification)

Figure 8:
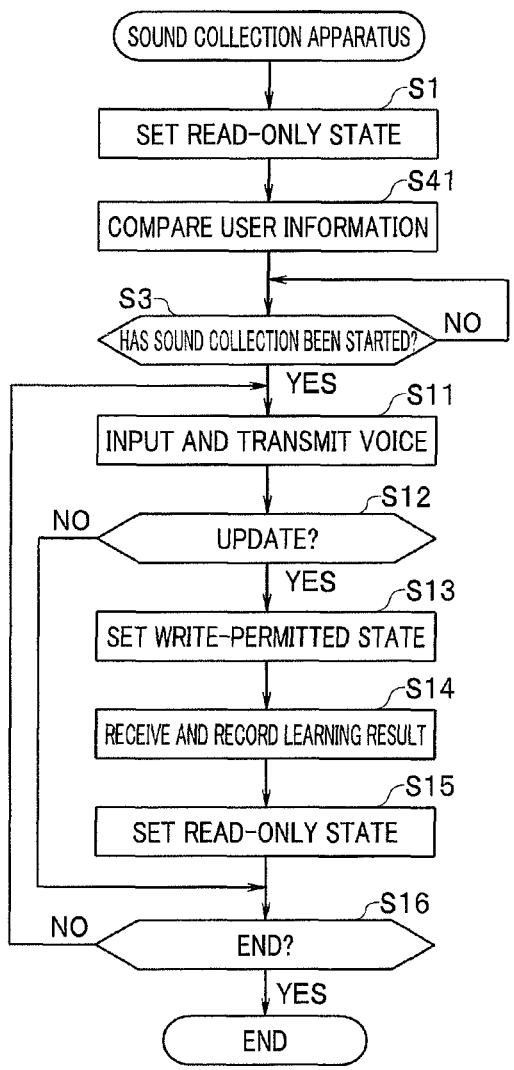
FIG. 8 is a flowchart illustrating operation of a sound collection apparatus according to a modification.
Figure 9:
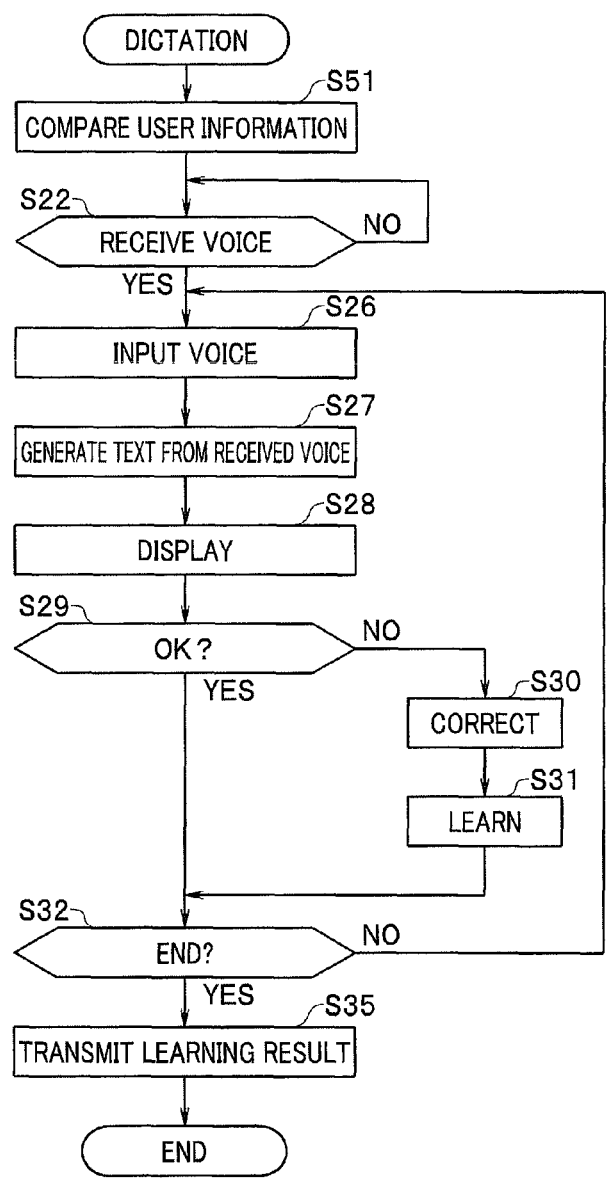
FIG. 9 is a flowchart illustrating dictation processing in the modification.

FIGS. 8 and 9 are each a flowchart illustrating a modification. FIG. 8 illustrates operation of the sound collection apparatus, and FIG. 9 illustrates dictation operation when dictation processing is performed by a computer on a cloud (not illustrated). In FIGS. 8 and 9, procedures identical to procedures in FIGS. 4 and 5, respectively, are denoted by identical reference signs, and description of the procedures will be omitted.

The operation illustrated in FIG. 8 includes user information comparison processing at step S41 in place of the exclusive user check processing at step S2 in FIG. 4. The operation illustrated in FIG. 9 includes user information comparison processing at step S51 in place of the exclusive user check processing at step S21 in FIG. 5. Typically, when dictation is performed by using a computer system on a cloud, it is expected that a dedicated recording region is allocated for each user. Thus, when the user of the sound collection apparatus 10 is identical to the exclusive user of the sound collection apparatus 10, operation the same as the operation performed in a case in which the exclusive users are identical to each other in the first embodiment is performed.

To use the recording region dedicated to each user, the control unit 1 of the sound collection apparatus 10 performs the user information comparison processing at step S41, and a computer on a cloud performs the user information comparison processing at step S51. Through the comparison processing, the computer on the cloud performs dictation by using a recording region for the exclusive user of the sound collection apparatus 10.

Thus, as illustrated in FIG. 8, the sound collection apparatus 10 only performs the processing at steps S11 to S16 skipping steps S4 to S8 in FIG. 4. As illustrated in FIG. 9, the computer on the cloud only performs the processing at steps S26 to S32 and S35 skipping steps S23 to S25, S33, and S34 in FIG. 5.

Other effects are the same as an effect of the first embodiment.

When dictation is performed by using a computer system on a cloud in this manner, too, a learning result can be recorded in the sound collection apparatus 10 so that reliable dictation can be performed with improved voice recognition performance when a personal computer of another person or a shared personal computer is used at next dictation.

Note that the sound collection apparatus 60 in USB connection may be connected with a computer on a cloud through the information processing apparatus 20 so that dictation is executed by using the computer on the cloud. In such a case, the sound collection apparatus 60 needs to perform the user information comparison processing in place of the exclusive user check processing at step S2 in the flowchart illustrated in FIG. 7 and employ only the processing when the exclusive users are identical to each other.

In the above-described embodiments, an example in which the sound collection apparatus directly outputs, to the information processing apparatus, voice data obtained by performing noise cancellation processing and predetermined sound quality adjustment on collected voice was described. However, the sound collection apparatus, which includes a personal dictionary, may use the personal dictionary to correct characteristics of voice by the exclusive user, and then output the voice data to the information processing apparatus 20. In such a case, the information processing apparatus is likely to be able to perform highly accurate voice recognition processing without using the personal dictionary.

In the above-described embodiments, an example in which a personal dictionary is transferred from the sound collection apparatus to the information processing apparatus when the exclusive user of the sound collection apparatus is not identical to the exclusive user of the information processing apparatus, and update data of the personal dictionary when the exclusive users are identical to each other is transferred from the information processing apparatus to the sound collection apparatus was described. However, when connected with the information processing apparatus, the sound collection apparatus may transfer the personal dictionary to the information processing apparatus, or may transfer the personal dictionary to the information processing apparatus in response to a request from the information processing apparatus irrespective of user information. Alternatively, when connected with the sound collection apparatus, the information processing apparatus may transfer update data of the personal dictionary to the sound collection apparatus, or may transfer update data of the personal dictionary to the sound collection apparatus in response to a request from the sound collection apparatus irrespective of user information.

The present invention is not limited to the above-described embodiments. When the present invention is carried out, any component may be modified and realized without departing from the scope of the present invention. In addition, various kinds of inventions may be achieved through appropriate combination of a plurality of components disclosed in the above-described embodiments. For example, some of all components indicated in the embodiments may be deleted. For example, the present invention is not limited to dictation but also applicable to voice operation of an instrument. The present invention may be used with, for example, a translation device or combined with a voice output apparatus to perform communication, search function support, and conversation with a robot. That is, the present invention includes a sound collection unit, and a recording unit recording a personal dictionary used in voice recognition processing on voice collected by the sound collection unit, thereby smoothly performing instrument operation and communication support through voice recognition.

Note that when any operation processes in the claims, the specification, and the drawings are described with words such as "first" and "subsequently" for sake of convenience, it is not essential to perform the processes in the stated order. Part of each step in the operation processes, which does not affect the gist of the invention may be omitted as appropriate.

Note that, among technologies described above, control mainly described with a flowchart can be often set by a computer program, which, in some cases, is recorded in a semiconductor recording medium, or other recording mediums, or a recording unit. The recording to the recording medium or the recording unit may be performed at product shipment, performed by using a distributed recording medium, or performed by downloading through the Internet. External instruments may cooperate as necessary to replace some functions and determination.

What is claimed is:

1. A sound collection apparatus comprising:
a sound collection unit including a microphone configured to collect sound;
a recording unit configured to record a personal dictionary used in voice recognition processing at dictation of voice collected by the sound collection unit;
a control unit configured to control provision of the personal dictionary to an information processing apparatus configured to execute dictation of voice collected by the sound collection unit; and
a communication unit configured to transmit voice collected by the sound collection unit to the information processing apparatus and transmit, under control of the control unit, the personal dictionary to the information processing apparatus,
wherein the control unit determines whether the personal dictionary is allowed to be provided to the information processing apparatus based on user information in the information processing apparatus.

2. A sound collection apparatus comprising:
a sound collection unit including a microphone configured to collect sound;
a recording unit configured to record a personal dictionary used in voice recognition processing at dictation of voice collected by the sound collection unit;
a control unit configured to control provision of the personal dictionary to an information processing apparatus configured to execute dictation of voice collected by the sound collection unit;
a communication unit configured to transmit voice collected by the sound collection unit to the information processing apparatus and transmit, under control of the control unit, the personal dictionary to the information processing apparatus;
a determination unit configured to determine whether update data of the personal dictionary updated as a result of learning through voice recognition processing by the information processing apparatus is allowed to be recorded; and
a write permission control unit configured to set the recording unit to a read-only state, and set the recording unit to a write-permitted state only in a duration in which it is determined by the determination unit that the update data is allowed to be recorded.

3. The sound collection apparatus according to claim 2, wherein the determination unit determines whether the update data is allowed to be recorded based on user information in the information processing apparatus.

4. The sound collection apparatus according to claim 2, wherein the determination unit determines whether the update data is allowed to be recorded based on a request from the information processing apparatus.

5. The sound collection apparatus according to claim 2, wherein
the recording unit is mounted by the information processing apparatus, and
the write permission control unit temporarily cancels mounting of the recording unit at switching between the read-only state and the write-permitted state.

6. A sound collection method comprising:
a procedure of collecting sound by a sound collection unit including a microphone;
a procedure of determining whether a personal dictionary used in voice recognition processing employed at dictation by an information processing apparatus configured to execute dictation of voice collected by the sound collection unit is allowed to be provided to the information processing apparatus; and
a communication procedure of transmitting voice collected by the sound collection unit to the information processing apparatus and transmitting the personal dictionary to the information processing apparatus based on a determination result indicating whether the personal dictionary is allowed to be provided to the information processing apparatus,
wherein the procedure of determining whether the personal dictionary is allowed to be provided to the information processing apparatus is based on user information in the information processing apparatus.

* * * * *